United States Patent [19]

Stopa

[11] Patent Number: 5,157,382
[45] Date of Patent: Oct. 20, 1992

[54] DIRECTIONAL INFORMATION CONVEYING METHOD AND APPARATUS

[75] Inventor: James L. Stopa, Old Saybrook, Conn.

[73] Assignee: Whelen Technologies, Inc., Chester, Conn.

[21] Appl. No.: 599,648

[22] Filed: Oct. 18, 1990

[51] Int. Cl.[5] .............................................. B60Q 1/34
[52] U.S. Cl. .................................... 340/475; 340/478
[58] Field of Search ............... 340/471, 472, 475, 478, 340/907, 908.1

[56] References Cited

U.S. PATENT DOCUMENTS

| | | | |
|---|---|---|---|
| 3,500,315 | 3/1970 | Shimada | 340/478 |
| 4,556,862 | 12/1985 | Meinershagen | 340/478 |
| 4,827,245 | 8/1989 | Lipman | 340/478 |
| 4,868,719 | 9/1989 | Kouchi et al. | 340/478 |

Primary Examiner—Jin F. Ng
Assistant Examiner—Dov Popovici
Attorney, Agent, or Firm—Chilton, Alix & Van Kirk

[57] ABSTRACT

Information as to a direction(s) to be followed to avoid a hazard is unambiguously transmitted by energizing lamps of an array in accordance with stored data whereby unique sequential flash patterns are generated. A selectable pattern includes a long initial flash followed by a plurality of relatively short flashes which progress in stepwise fashion in the direction of desired observer motion, the pattern ending with a terminal lamp of the array being flashed repetitively. The pattern is then caused to repeat after an off time which is of long duration relative to at least the short flashes of the pattern.

11 Claims, 13 Drawing Sheets

DIRECTIONAL INFORMATION CONVEYING METHOD AND APPARATUS

BACKGROUND OF THE INVENTION

1. Field of the Invention

The present invention relates to the generation of a highly visible and readily perceivable directional warning and particularly to the exercise of control over an array of lamps in a highway safety environment. More specifically, the present invention is directed to a lighting system which employs a plurality of lamps, the lamps being oriented in a linear array, the system including an operator-selectable mode control which will cause the lamps to be energized in several predetermined sequences, the flash patterns thus produced readily and unambiguously conveying directional information to an observer. Accordingly, the general objects of the present invention are to provide novel and improved methods and apparatus of such character.

2. Description of the Prior Art

Warning lights employing incandescent lamps or gaseous discharge tubes are well known in the art. When used individually, such warning lights attract attention by periodically producing a burst of energy in the visual spectrum. In the environment of highway safety, such individual warning lights are exceedingly useful in alerting oncoming traffic to the existence of a potential hazard. Such warning lights do not, however, convey any information as to the nature of the evasive action which is required to avoid the hazard.

Light systems which provide directional information are also known in the art. Such directional light systems typically include a plurality of lamps arranged to outline an arrow, all of the lamps being periodically simultaneously energized. In order for the directional information conveyed by such flashing "signs" to be seen and understood at a sufficiently great distance to successfully perform the intended warning function, the signs must have very large physical dimensions. Accordingly, while such signs can for example be mounted on the back of a large truck or the like, they are not suitable for use on smaller emergency vehicles such as police cars.

It is also known to provide directional guidance to motorists by means of mounting individual warning lights on spaced barricades and causing such warning lights to be energized in sequence. Such arrangements, of course, are lacking in flexibility and obviously cannot be easily and quickly erected upon occurrence of a hazardous situation.

There has been a long-standing desire for a light system capable of providing directional guidance while being sufficiently compact to allow its mounting in locals such as, for example, the rear deck of a police cruiser or beneath a lightbar mounted on the top of a police cruiser. In order to be usable, such a compact directional warning light system must, of course, produce information which is both visible at a considerable distance and readily understandable.

SUMMARY OF THE INVENTION

The present invention overcomes the above-briefly discussed and other deficiencies and disadvantages of the prior art by providing a novel and improved technique for generating a directional warning. The present invention also encompasses a light system for implementing this novel technique.

Apparatus in accordance with the invention comprises an array of lamps and a control which, in response to user generated mode commands, can cause energization of the lamps in accordance with a preselected flash pattern. The modes of operation of the system, i.e., the selectable flash patterns, are unique in their ability to attract attention and then unambiguously convey directional information. The directional information, in a typical system, will advise the observer to pass to the left or the right of the array or inform the observer that it is safe to pass on either the right or the left.

In accordance with a preferred embodiment, the invention includes a microprocessor which provides control signals of the appropriate duration in the proper sequence to switches which cause the energization of associated of the lamps of the array. The apparatus further includes means by which an operator may generate a command signal, commensurate with the desired operational mode, for delivery as an input to the microprocessor.

The microprocessor implements a unique method for conveying visually observable directional steering information wherein the lamps of the array are energized in a predetermined sequential order to produce a flash pattern which unambiguously conveys directional steering information. The energization technique causes a first lamp of the array to be energized for a duration of time t1 followed by causing at least second and third lamps of the array to be serially energized for a duration of time t2, time t2 being less than time t1, the second and third lamps being respectively displaced from the first lamp in the steering direction by distances d1 and d2, distance d2 being greater than distance d1. After turn-off of the third (or subsequent) lamp, a further lamp of the array is repetitively energized, the duration of each energization of the further lamp, which will typically be a terminal or end lamp of the array, being a time t3. The terminal lamp will be displaced from the first lamp by a distance which is greater than d2.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and which.

DESCRIPTION OF THE DISCLOSED EMBODIMENT

Figure 1:
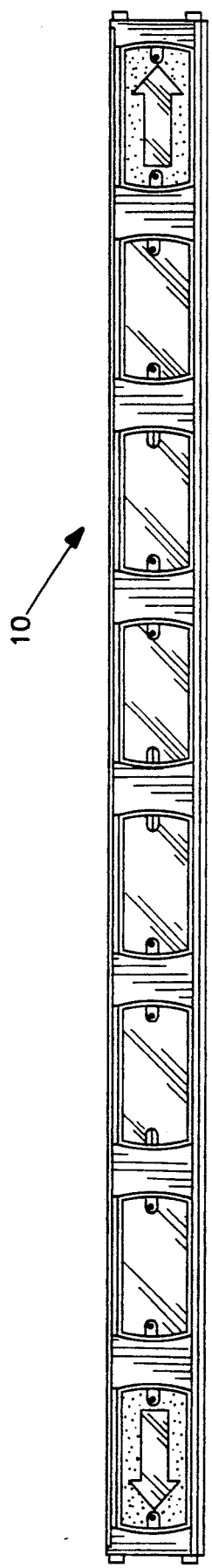
FIG. 1 is a front elevational view of a first embodiment of a directional warning light system in accordance with the present invention.

With reference now to the drawings, FIG. 1 depicts an eight light directional warning light array, indicated generally at 10, in accordance with the present invention. Each light of array 10 will typically be a halogen lamp which is provided with a reflector and a lens. In the disclosed embodiment, the lenses associated with the two outboard lamps are in the form of opaque lens covers with transparent portions which outline directional arrows. It should be understood, however, that such directional arrows are not required and, because of the compactness of the warning light system, are only visible a relatively short distance from the array.

Figure 3A:
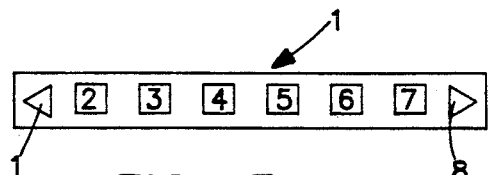
FIGS. 3a–3d present timing information and the program variables of the control of FIG. 2.

For convenience, the individual lights of array 10 will hereinafter be referred as lights Nos. 1–8, beginning with the light located furthest to the left. A schematic representation of array 10 with these numbers applied forms FIG. 3a. In the disclosed embodiment of the invention, the operator can select four separate operational modes. These modes are "left arrow", "right arrow", "split" and "flash". In the left arrow mode, lamps 7-1 are serially energized, i.e., only one lamp will be on at any time during the flash pattern duration which begins with the energization of lamp 7. A unique feature of the present invention resides in the fact that at the start of the series or pattern, lamp 7 will be energized for a period of time which is greater in duration than the on-time of the other lamps. A further unique feature of the invention resides in the fact that, at the end of the pattern, lamp 1 will be energized to generate multiple flashes. The right arrow mode will be the same as the left arrow mode except that the energization sequence will be lamps 2–8.

In accordance with the split mode of operation, which will advise approaching traffic that it is safe to pass to either side of the array, lamps 4 and 5 will be energized simultaneously followed by lamps 3 and 6, lamps 2 and 7 and lamps 1 and 8. As in the case of the arrow modes, the first two lamps to be energized will be turned on for a longer time than the immediately following lamps and the last two lamps to be turned on will be caused to produce multiple flashes.

In the "flash" mode the array will function as a warning device only, i.e., no directional information will be produced. In the disclosed embodiment, lamps 4 and 5 will be simultaneously energized for a predetermined period followed by the energization of lamps 2 and 7, also for a predetermined period, and the cycle will then repeat. Obviously, the "flash" mode is subject to considerable variation as to the manner in which the lamps of the array are energized.

Figure 2:
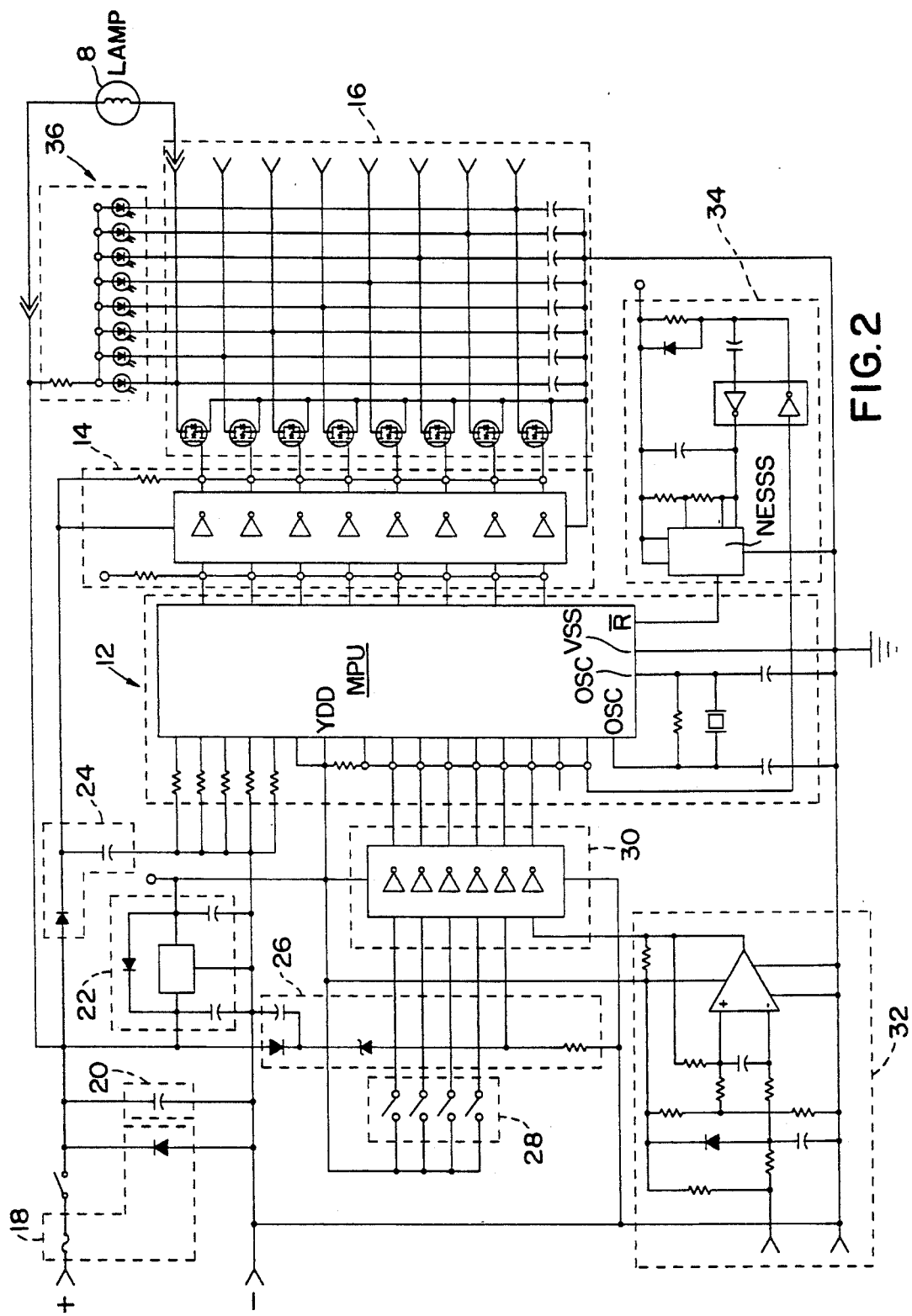
FIG. 2 is an electrical schematic depicting, in block diagram form, a control for the system of FIG. 1.

Referring to FIG. 2, a control for a directional guidance light system in accordance with the present invention is depicted schematically. This control incorporates a microprocessor 12 which, in accordance with the disclosed embodiment, is an EPROM device operated as an interrupt driven system based on a 2 ms clock. Microprocessor 12, as is conventional, includes a crystal controlled oscillator, RAM, ROM, program counter, etc. Microprocessor 12 provides, via a level shifter 14, control signals for the solid state switches of a switch array 16. As depicted in the drawing, the individual switches of array 16 are power MOSFET's, there being one switch for each lamp of the array 10. Only a single one of the lamps, lamp No. 8, is shown on FIG. 2. The level shifter 14 provides gate drive for the switches of array 16, i.e., the 5 v output of microprocessor 12 is raised to the 12 v level necessary to gate the MOSFET's into conduction by the level shifter. The lamps of the array are connected across the DC power supply, not shown, by the closing of the associated switches of switch array 16 whereby current will flow through the lamp filament, thus generating light.

The control of FIG. 2 also includes a reverse polarity protection circuit 18. In the disclosed embodiment, circuit 18 is a conventional "crowbar" circuit which will cause the blowing of a fuse if the power supply is connected to the control circuit with the wrong polarity. A ripple filter 20, depicted as a capacitance, is connected across the supply voltage terminals. A low voltage regulator 22, also connected across the supply voltage terminals, provides the operating voltage for microprocessor 12. A peak voltage detector 24 is provided to ensure that voltage to be applied to the lamps remains constant and at the proper level which, in the case of a motor vehicle installation, will be 12 v. A voltage detector 26 is connected across the supply voltage input terminals and provides a signal indicative of the supply voltage falling below the required level. The inclusion of the voltage level detector 26 enables the employment of a solar cell array as the source of the supply voltage. The output signal from voltage detector 26 functions as one of the inputs to the microprocessor and the existence of a low supply voltage will result in the control being turned off. Further inputs to the microprocessor are derived from an operator's mode select console 28 which is depicted schematically as an array of four manually operable switches.

The signal provided by voltage detector 26 and the state of the switches on console 28 are delivered as inputs to microprocessor 12 via an input buffer 30. A further input for the microprocessor also routed through buffer 30, is provided by a photocell hysteresis amplifier 32. A photocell, not shown, will typically be connected across the input terminals of hysteresis amplifier 32 and the output of the amplifier will be a voltage level commensurate with whether the lamps of array 10 should be operated in a high or low intensity power mode. Restated, the duty cycle of the lamps of array 10 will typically be automatically adjusted as a function of the ambient lighting conditions so that more light is generated during daylight hours than after dark. Use of a hysteresis amplifier, which is characterized by a preselected time delay, ensures that there will be no "jitter" at the switch point between low and high ambient light conditions.

A "watchdog" timer 34 is connected to the reset terminal of microprocessor 12 Under normal operating conditions, microprocessor 12 provides a series of pulses to the input of timer 34 and the output of the type 555 square wave pulse generator of timer. 34 will remain in its "high" state. When a "fault" condition occurs, for example a low supply voltage signal is inputted to the microprocessor, the output of the microprocessor which is connected to the input terminal of timer 34 will go either "high" or "low" and timer 34 will begin to "toggle", i.e., reset pulses will be applied to the reset input of the microprocessor. The microprocessor will, of course, start on a "fault" condition, i.e., when power is first applied, the watchdog timer will reset the microprocessor.

In the disclosed embodiment, the control also includes status indicators, indicated generally at 36, in the form of light emitting diodes which are connected in parallel with respective of the lamps of array 10. These status indicators 36 will typically be mounted on or adjacent the mode selector console 28 and will allow the operator to monitor the status of the lamps of the array.

Figure 4:
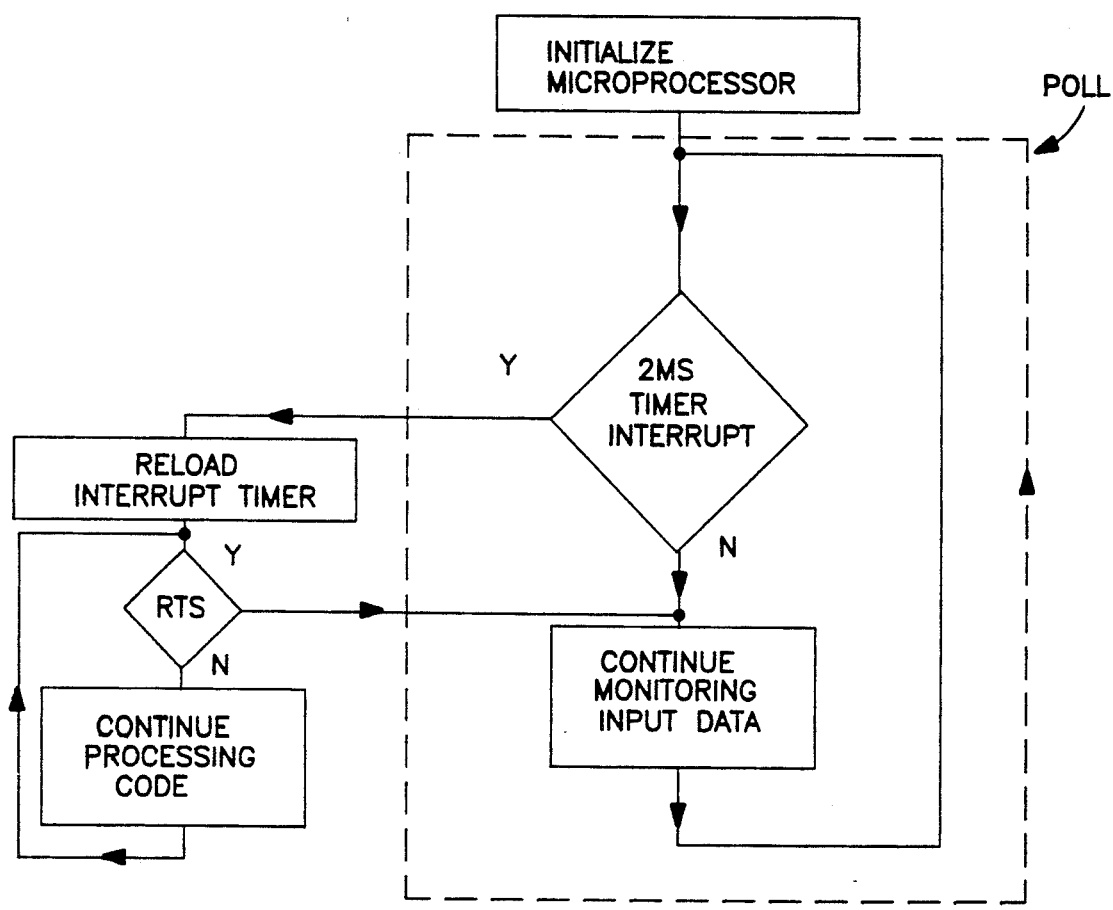
FIG. 4 is an overall flow diagram representing operation of the microprocessor of the control of FIG. 2.
Figure 5A:
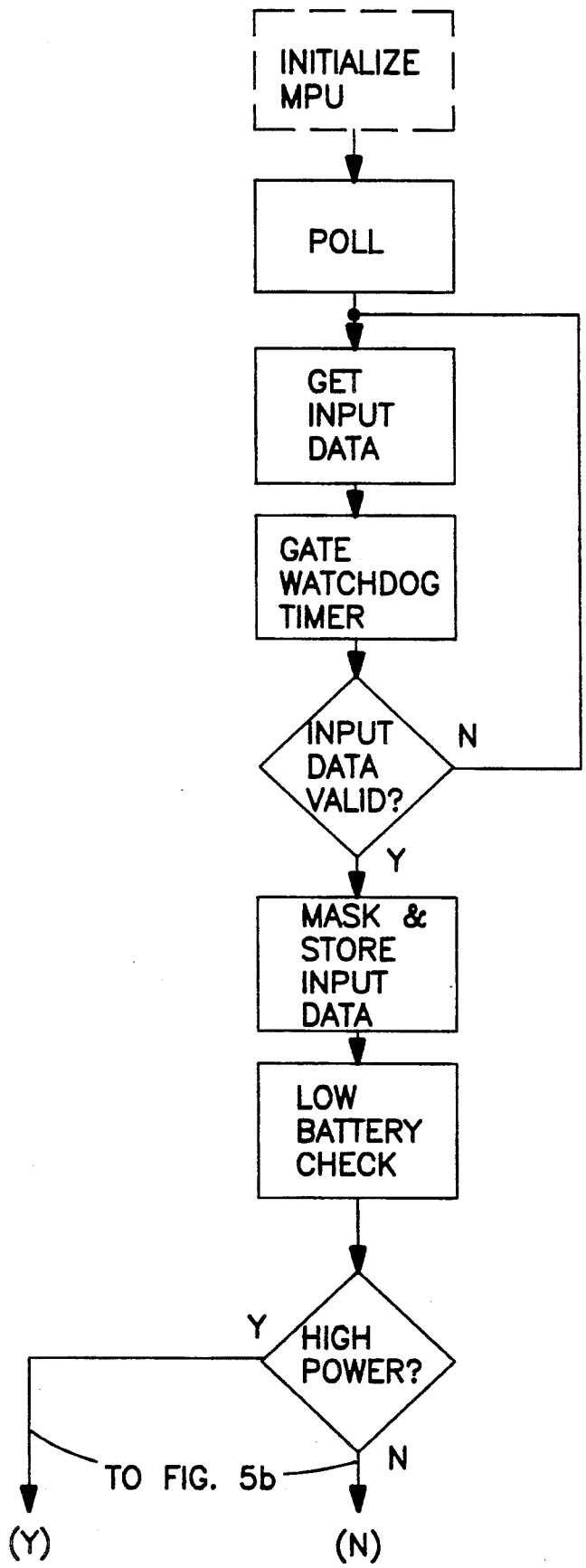
FIGS. 5a–5c comprise an information flow diagram which explains the operation of the polling routine of the control of FIG. 2 in accordance with a preferred embodiment of the invention.
Figure 5B:
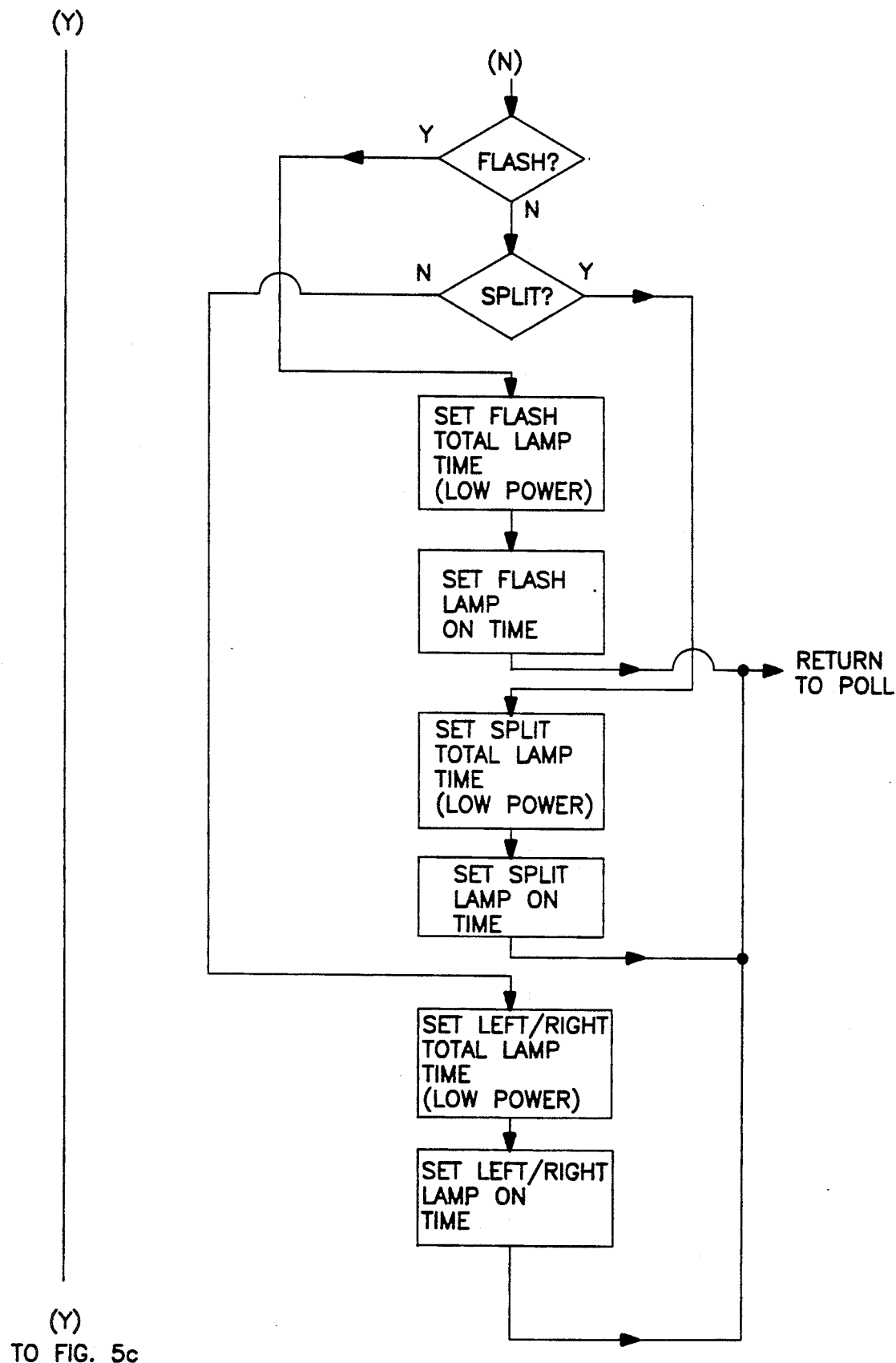
Figure 5C:
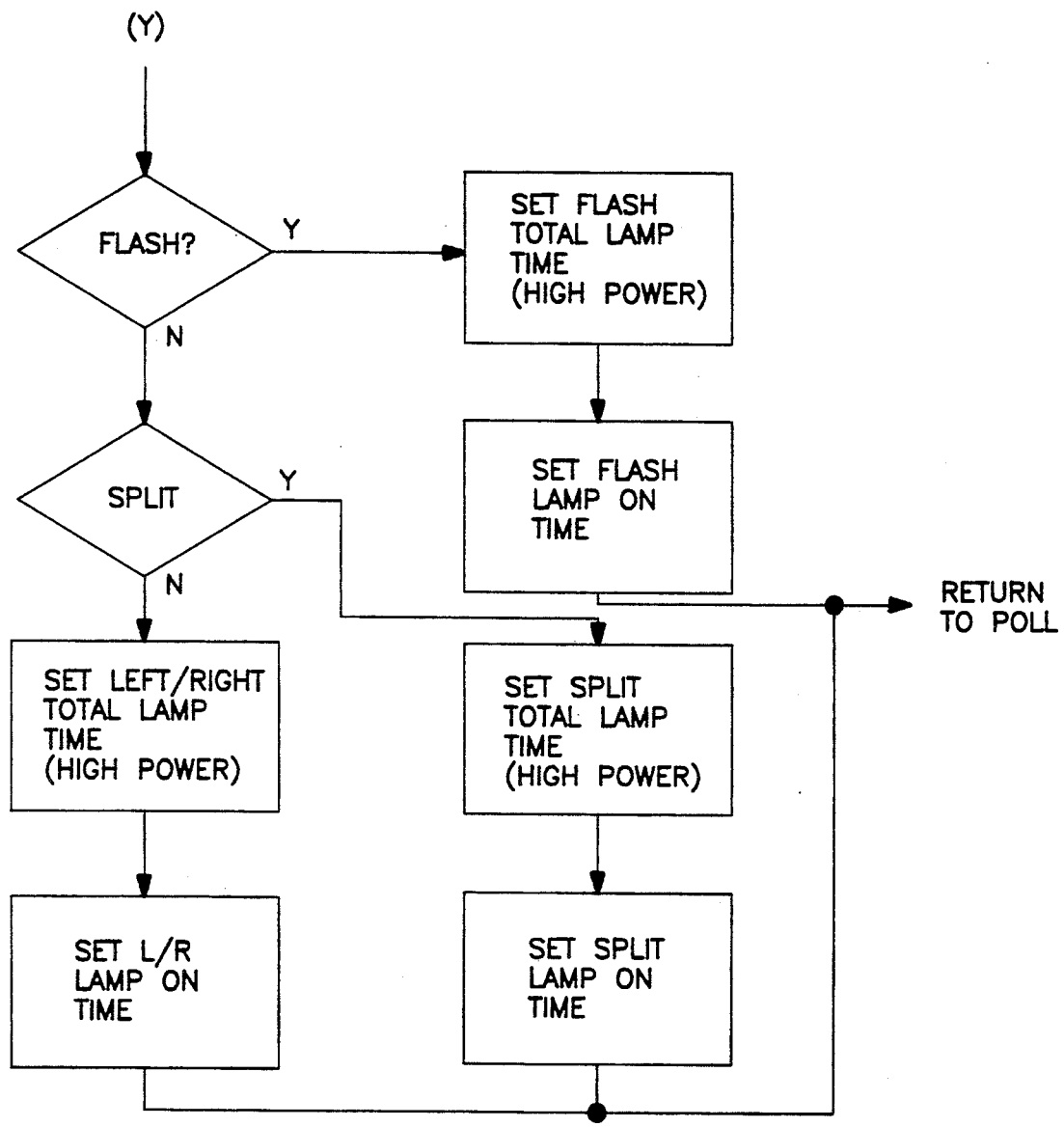
Figure 6:
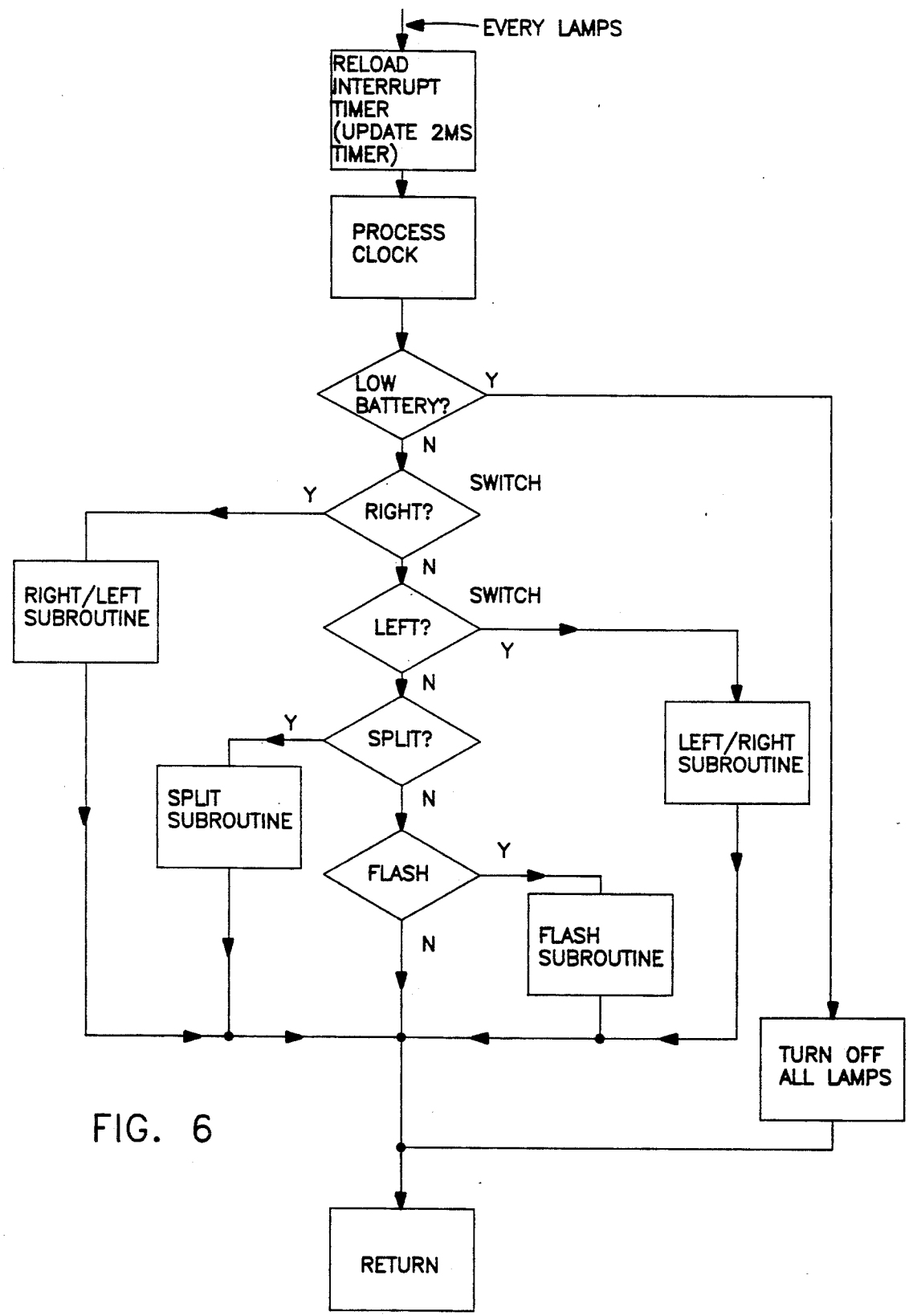
FIG. 6 is a flow diagram which explains the interrupt routine of the control of FIG. 2.
Figure 7A:
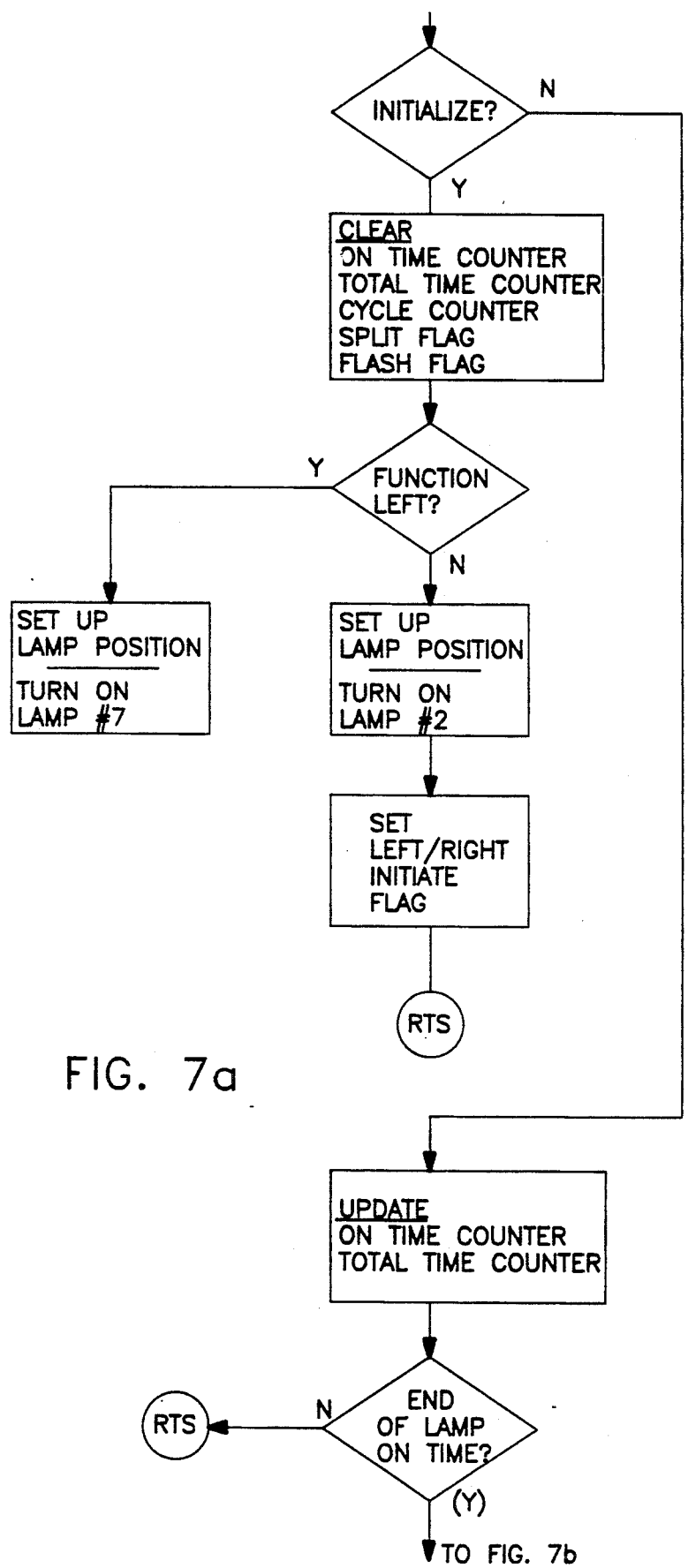
FIGS. 7a–7d comprise a flow diagram which explains the left/right arrow subroutine of FIG. 6.
Figure 7B:
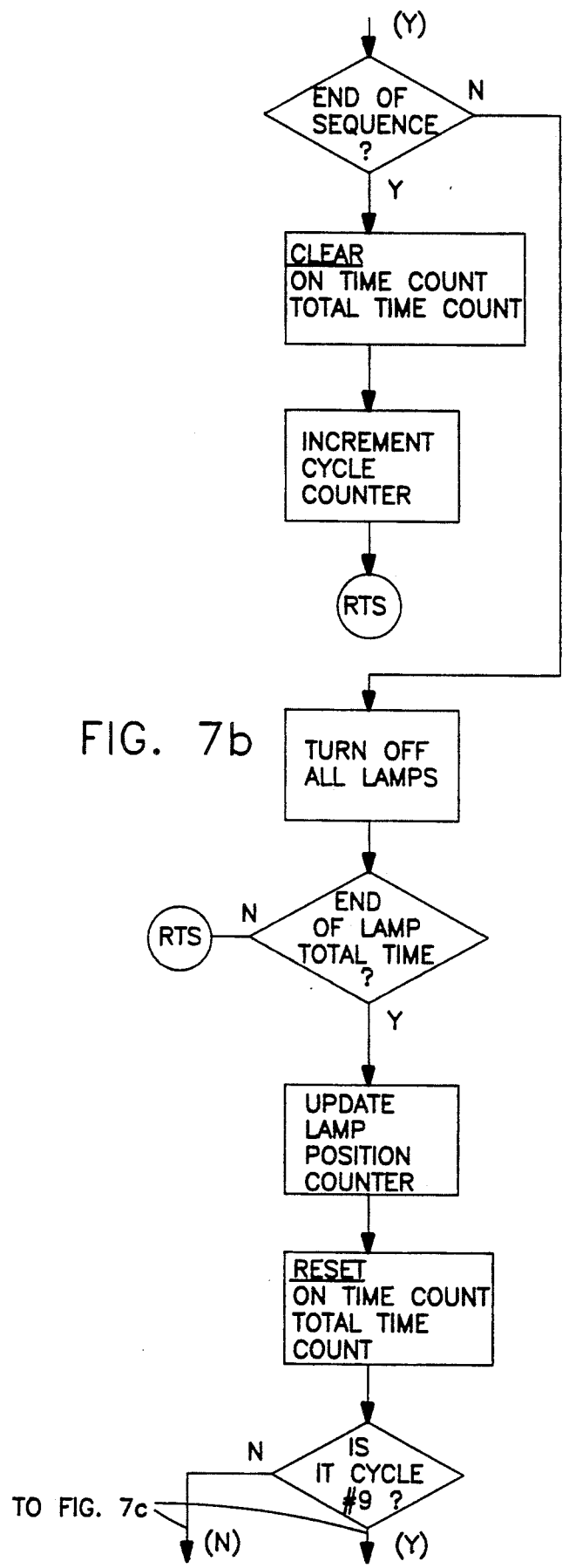
Figure 7C:
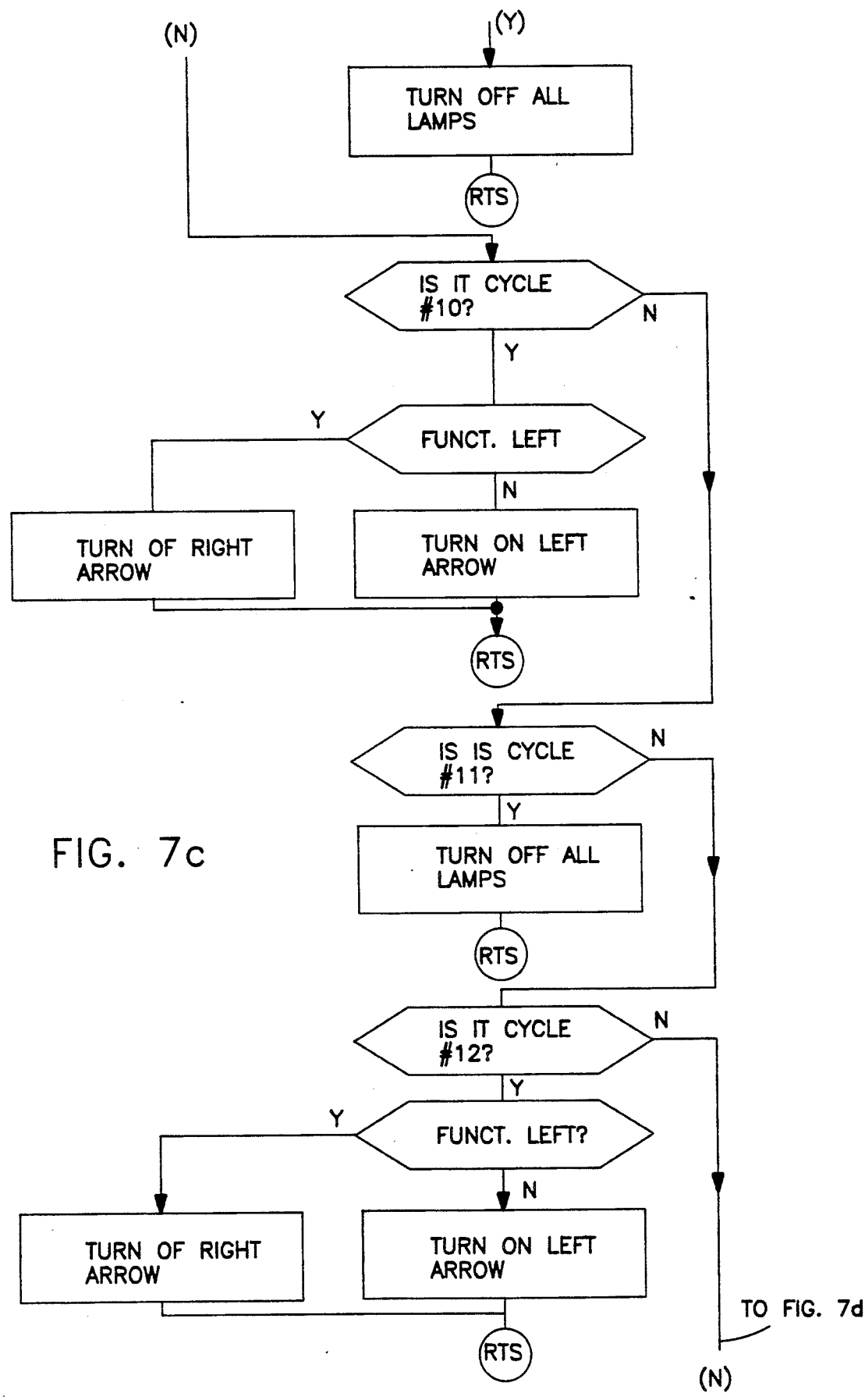
Figure 7D:
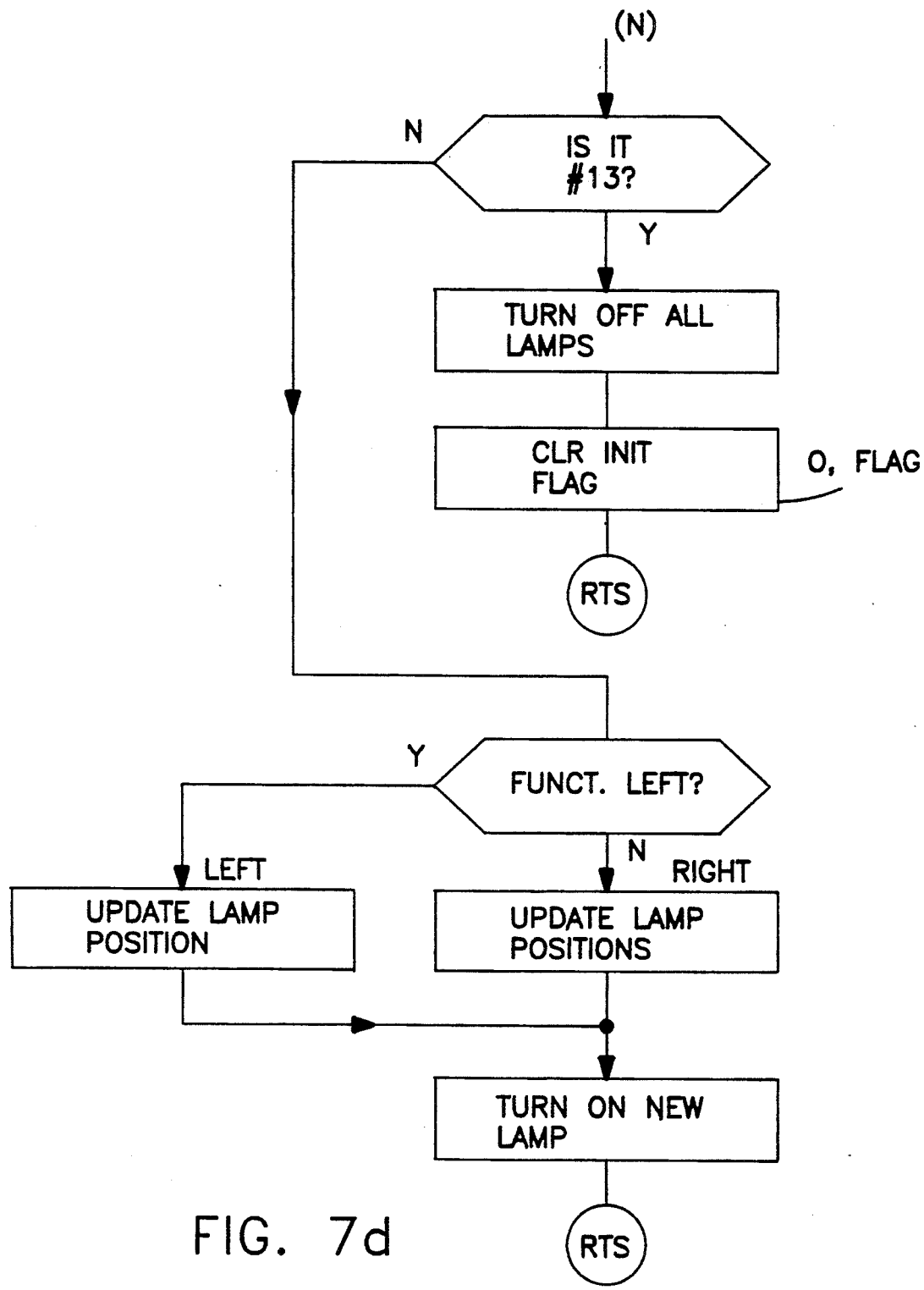

FIG. 4 is a simplified flow diagram which shows the operation of a conventional interrupt driven microprocessor. It is believed that understanding of the flow diagrams of FIGS. 5-8 will be facilitated by simultaneous reference to FIG. 4.

Figure 3B:
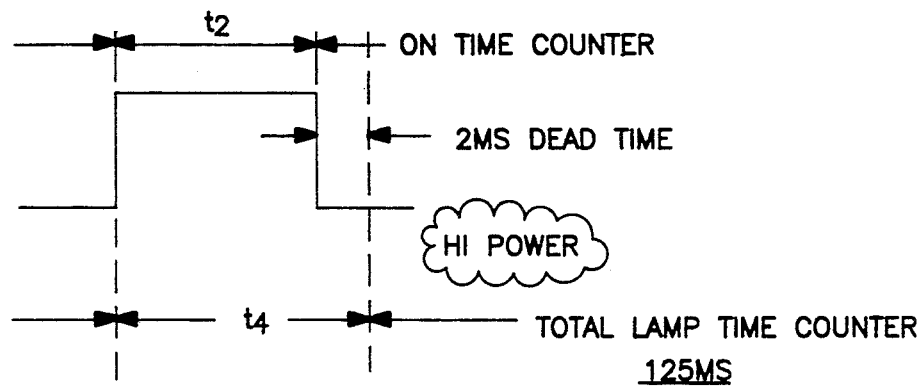
Figure 3C:
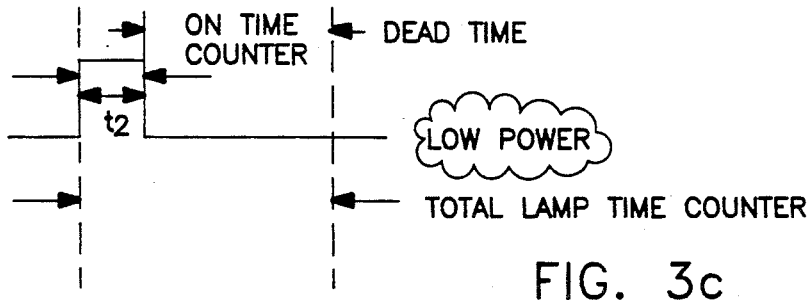
Figure 3D:
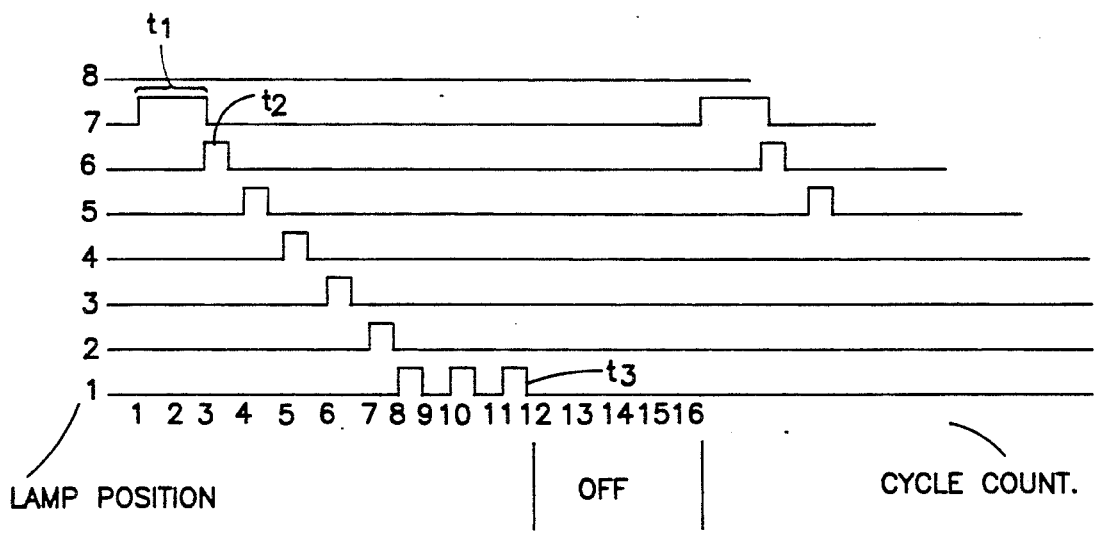

In the practice of the present invention, there are four program variables, namely the on time count, the total lamp time count, the cycle or lamp cycle duration count and lamp position. FIGS. 3b and 3c respectively show the on time count (time t2) and total lamp time count (time t4) information for the high power and low power operating modes. Both the on time count and total lamp time counts are variable in 2 ms increments and the "dead" time, i.e., the time between de-energization of one lamp and the next successive lamp energization is determined by the total lamp time count minus the on-time count. The cycle count, in the disclosed embodiment, is set to 16 with lamps being energized during a portion of cycles 1-8, 10 and 12 when the arrow mode of operation is selected. In the disclosed embodiment, which is an eight lamp array, there are eight lamp positions. FIG. 3d is a representation of the lamp position and cycle count variables in the left arrow mode of operation, i.e., during the generation of a signal which directs an observer to pass to the left of the array by beginning the flash sequence adjacent the right side of the array. Thus, referring to FIG. 3d, it may be seen that in the left arrow mode lamp No. 7 is energized for two cycles (time t1=time t4+time t2) followed by the one cycle energization of lamps 6-2 with the sequence ending with the flashing of lamp 1 three times with each flash being of duration t3 and the time between each of the flashes being t4 plus the dead time. In the disclosed embodiment, t3=t2. The duration of the flashes, i.e., the on time count, will be a function of the output of amplifier 32. The dead time depicted in FIGS. 3b and 3c is not, because of scale, represented on FIG. 3d. The program variables can, of course, be changed to produce the desired visual effect. However, tests have shown that exceptionally good results in terms of observer notice and comprehension are achieved employing the present invention wherein directional information is conveyed by the generation of a flash pattern which progresses in the direction to which the observer is to be diverted with the first flash of each pattern being relatively long, the intermediate flashes being relatively short and the final lamp in the array being caused to produce multiple flashes. The ability of an observer to comprehend the information which it is sought to convey is also enhanced by having a relatively long off-time after the final flash of the pattern, i.e., before the pattern begins to repeat. The flash pattern represented by FIG. 3d falls within the criteria stated above and employs, in the case of a left arrow, an on time for lamp No. 7 which is twice the on time of each of lamps 6 - 2. Lamp 1 is, at the end of the pattern, caused to produce three flashes, each flash typically having the same duration the on time of lamps 6 - 2, and the pattern concludes with an off time equivalent to four cycle counts (t4×4), i.e., four total lamp time counts.

When power is applied, the control is initialized. Thus, in the known and conventional manner, the data registers are loaded to set up the input and output ports, the appropriate RAM addresses are cleared and the system timer is set for the 2 ms time out. After initialization, the system jumps to the polling routine represented in FIGS. 5a-5c. The poling subroutine is represented by the "2 ms TIMER INTERRUPT" decision and "CONTINUE MONITORING INPUT DATA" step of FIG. 4. When an interrupt occurs subsequent to completion of the polling routine, the system will jump to the interrupt subroutine as broadly represented in FIG. 4 by the return from subroutine (RTS) decision and "RELOAD INTERRUPT TIMER" and "CONTINUE PROCESSING CODE" instructions of FIG. 4. The interrupt subroutine is shown in greater detail in FIG. 6.

FIGS. 7a-7d represent the left/right arrow subroutines which are implemented under the interrupt routine. As may be seen from FIGS. 7a-7d, there are a number of places in the left/right arrow subroutine where a return from the subroutine (RTS) decision is made. These returns may be either to the polling routine or interrupt routine but, for purposes of explanation, may be considered as a return to the polling routine. Presuming no change in the input data to the microprocessor, the return from subroutine (RTS) will not have an effect which is apparent to an observer of the directional light system due to the speed of operation of the microprocessor.

Figure 8:
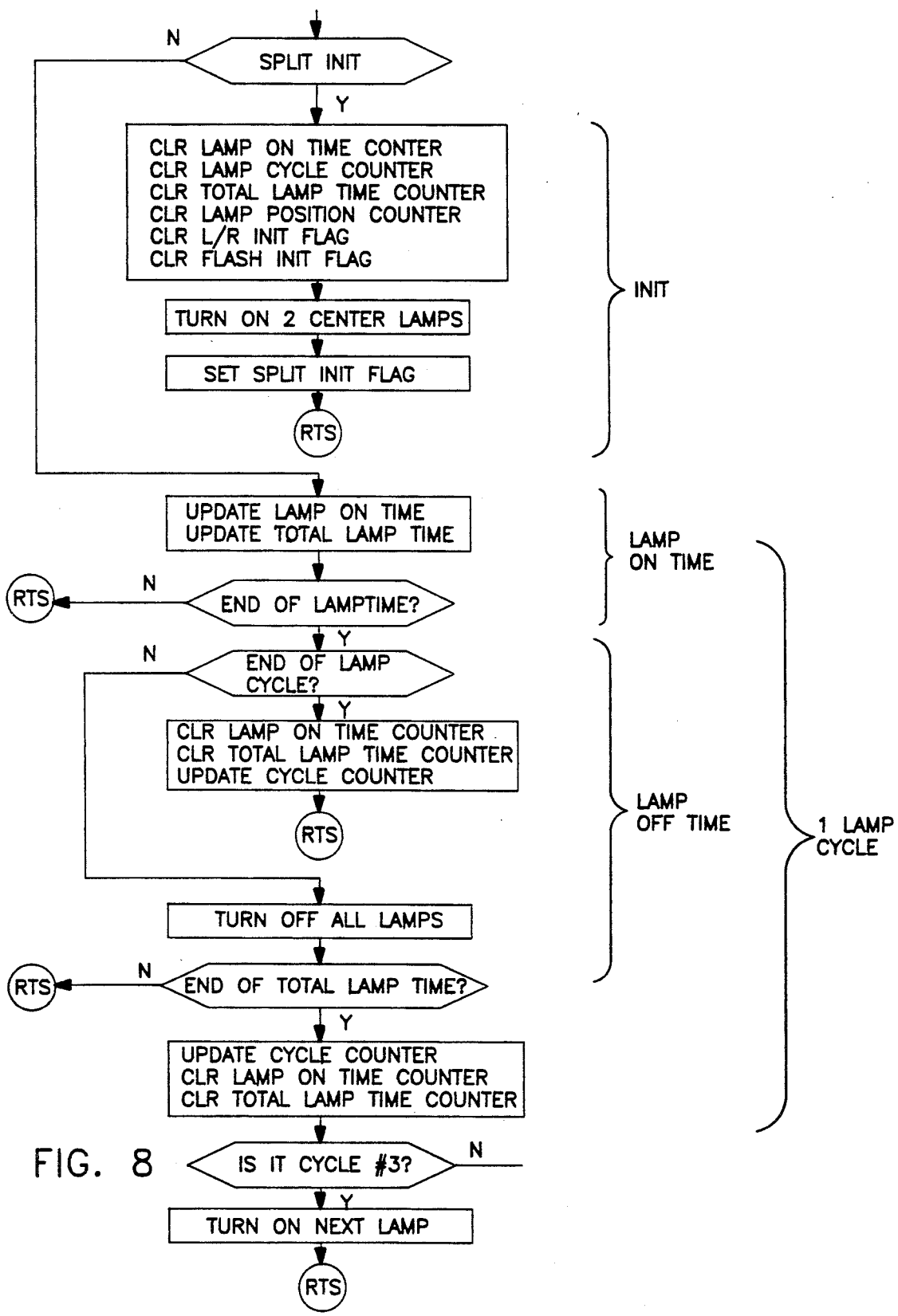
FIG. 8 is a flow diagram which explains the split subroutine of FIG. 6.

FIG. 8 is a flow diagram for the "split" mode of operation. FIG. 8 provides the same information as FIGS. 7a-7d for the left/right arrow modes.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for conveying visually observable directional steering information, said method comprising the steps of:
    mounting a plurality of spacially displaced lamps on support means to provide a generally linear lamp array;
    energizing the lamps of the array individually in a predetermined sequential order to produce a flash pattern which unambiguously conveys directional steering information, the step of energizing comprising:
        causing a first lamp of the array to be energized for a duration of time t1;
        causing at least second and third lamps of the array to be serially energized for a duration of time t2 subsequent to de-energization of said first lamp, time t2 being less than time t1, the second and third lamps being respectively displaced from the first lamp in the steering direction by distances d1 and d2, the distance d2 being greater than d1, and
        causing a further lamp of the array to be repetitively energized subsequent to the de-energization of the last of said at least second and third lamps to be energized,
    the duration of each energization of said further lamp being a time t3, said further lamp being displaced from the first lamp by a distance which is greater than d2.

2. The method of claim 1 wherein time t1 is at least twice as long as time t2.

3. The method of claim 1 wherein the time t3 is substantially equal to time t2.

4. The method of claim 1 wherein the flash pattern comprises a plurality of lamp cycles, each of said lamp cycles comprising a predetermined time which is equal to the time t2 plus a dead time corresponding to a delay between the de-energization of said second lamp and the energization of said third lamp, a percent of each of said lamp cycles during which one of said lamps is energized being a duty cycle, the number of said lamp cycles exceeding the number of lamp energizations.

5. The method of claim 4 wherein the duty cycle is varied as a function of the ambient lighting conditions.

6. The method of claim 4 wherein the flash pattern is repetitively generated and wherein the plurality of lamp cycles during which no lamp is energized will follow the last energization in each pattern.

7. The method of claim 1 wherein the lamps are substantially evenly spaced and said further lamp is at an end of the array.

8. The method of claim 7 wherein time t1 is at least twice as long as time t2.

9. The method of claim 2 wherein the time t3 is substantially equal to time t2.

10. The method of claim 8 wherein the time t3 is substantially equal to time t2.

11. The method of claim 10 wherein the duty cycle is varied as a function of the ambient lighting conditions.

* * * * *